A. NEILL.
Making Rubber Heads for Lead Pencils.

No. 31,187. Patented Jan. 22, 1861.

Witnesses
James G. Davi
Dennis A. Dolan

Inventor
Arthur Neill

UNITED STATES PATENT OFFICE.

ARTHUR NEILL, OF BOSTON, MASSACHUSETTS.

MOLD FOR SHAPING INDIA-RUBBER PENCIL-HEADS.

Specification of Letters Patent No. 31,187, dated January 22, 1861.

*To all whom it may concern:*

Be it known that I, ARTHUR NEILL, of Boston, in the county of Suffolk and State of Massachusetts, have invented a new and useful or Improved Mold for Making India-Rubber Heads for Lead-Pencils, to be Used in Erasing Pencil-Marks, and do hereby declare the same to be fully described in the following specification and illustrated in the accompanying drawings, of which—

Figure 1:
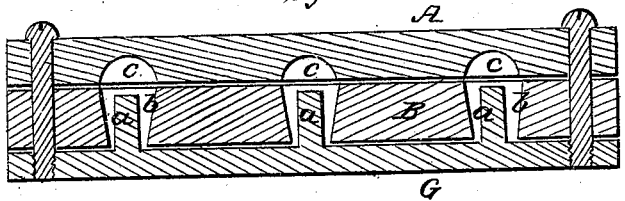
Figure 2:
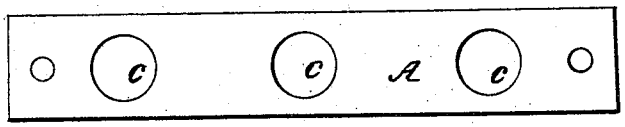
Figure 3:
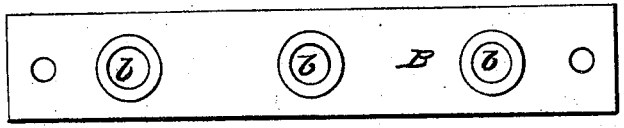
Figure 4:
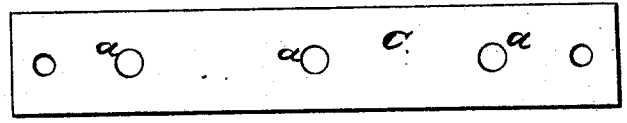

Figure 1, is a sectional view of it; Fig. 2, an under side view of the cap plate; Fig. 3, a top view of the middle plate; Fig. 4, a top view of the base or core plate.

The nature of my invention consists in the combination and arrangement of three metallic plates (one of them a core plate) by which I am enabled to produce an india-rubber head, to be fixed on one end of a lead pencil, not only giving the same a neat and ornamental appearance but making it (the pencil) of very great convenience to accountants.

In the drawings, A, is the cap plate, B the middle or matrix plate, C, the base or core plate, and $a$, the core. In constructing my mold I form in the middle plate B, a tapering hole as shown at $b$, in the drawings. With the radius of the larger circle of the said hole I construct the concavity, $c$, in the cap plate A, and axial with the tapering hole and the concavity I firmly fix the core $a$, as shown in the drawings, the object of the core being to form a cylindrical or square hole in the india rubber head into which the end of the pencil may be easily inserted. I would remark that the contour of the mold may be square or spheroidal, but I prefer the form herein described.

In operating with my mold I lay the matrix or middle plate on the base or core plate, and tamp or pack the plastic rubber around the core sufficiently to fill the matrix and concavity. I next lay the cap plate on the matrix plate and fasten all three firmly together. When this has been accomplished the mold is ready for vulcanizing the rubber therein. After the vulcanizing process has been completed I remove the core plate, next the cap plate, and now the vulcanized rubber pencil heads can be readily removed from the matrix plate.

I claim—

A mold composed of a core plate C, with its cores $a$, $a$, $a$, matrix plate B, and a cap plate A, combined and arranged together substantially as described and for the purpose set forth.

In testimony whereof I have hereunto set my signature this 22nd day of October A. D. 1860.

ARTHUR NEILL.

Witnesses:
   JAMES G. DAVIS,
   DENNIS A. DOLAN.